US008392665B2

(12) United States Patent
Moga et al.

(10) Patent No.: US 8,392,665 B2
(45) Date of Patent: Mar. 5, 2013

(54) ALLOCATION AND WRITE POLICY FOR A GLUELESS AREA-EFFICIENT DIRECTORY CACHE FOR HOTLY CONTESTED CACHE LINES

(75) Inventors: Adrian C. Moga, Portland, OR (US); Malcolm Mandviwalla, Hillsboro, OR (US); Vedaraman Geetha, Fremont, CA (US); Herbert H. Hum, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 349 days.

(21) Appl. No.: 12/890,649

(22) Filed: Sep. 25, 2010

(65) Prior Publication Data

US 2012/0079214 A1 Mar. 29, 2012

(51) Int. Cl.
*G06F 12/00* (2006.01)

(52) U.S. Cl. .................... 711/146; 711/141; 711/144

(58) Field of Classification Search .............. None
See application file for complete search history.

(56) References Cited

U.S. PATENT DOCUMENTS

| 6,009,488 | A  | 12/1999 | Kavipurapu |
| 6,625,694 | B2 | 9/2003  | Masri et al. |
| 6,687,789 | B1 | 2/2004  | Keller et al. |
| 6,779,036 | B1 | 8/2004  | Deshpande |
| 6,826,651 | B2 | 11/2004 | Michael et al. |
| 7,017,011 | B2 | 3/2006  | Lesmanne et al. |
| 7,096,323 | B1 | 8/2006  | Conway et al. |
| 8,041,898 | B2 | 10/2011 | Moga et al. |
| 2003/0041212 | A1 | 2/2003 | Creta et al. |
| 2003/0163649 | A1 | 8/2003 | Kapur et al. |
| 2005/0198187 | A1 | 9/2005 | Tierney et al. |
| 2006/0101209 | A1 | 5/2006 | Lais et al. |
| 2006/0143408 | A1 | 6/2006 | Sistla |
| 2007/0055826 | A1 | 3/2007 | Morton et al. |
| 2007/0233932 | A1 | 10/2007 | Collier et al. |
| 2008/0059710 | A1 | 3/2008 | Handgen et al. |
| 2009/0248989 | A1 | 10/2009 | Chicheportiche et al. |
| 2009/0276581 | A1* | 11/2009 | Moga et al. .......... 711/146 |
| 2010/0332762 | A1 | 12/2010 | Moga et al. |

FOREIGN PATENT DOCUMENTS

| CN | 101937401 A | 1/2011 |
| TW | 201106159 A1 | 2/2011 |
| WO | 2011/008403 A2 | 1/2011 |

(Continued)

OTHER PUBLICATIONS

International Search Report and Written Opinion for the PCT Application No. PCT/US2011/053317, mailed on Apr. 30, 2012, 8 pages.

(Continued)

*Primary Examiner* — Shawn X Gu
(74) *Attorney, Agent, or Firm* — Caven & Aghevli LLC

(57) ABSTRACT

Methods and apparatus relating to allocation and/or write policy for a glueless area-efficient directory cache for hotly contested cache lines are described. In one embodiment, a directory cache stores data corresponding to a caching status of a cache line. The caching status of the cache line is stored for each of a plurality of caching agents in the system. An write-on-allocate policy is used for the directory cache by using a special state (e.g., snoop-all state) that indicates one or more snoops are to be broadcasted to all agents in the system. Other embodiments are also disclosed.

30 Claims, 6 Drawing Sheets

FOREIGN PATENT DOCUMENTS

WO          2011/008403 A3      3/2011

OTHER PUBLICATIONS

Young, et al., "To Snoop or Not to Snoop: Evaluation of Fine-Grain and Coarse-Grain Snoop Filtering Techniques", Proceedings of the 14th International Euro-Par Conference on Parallel Processing (Euro-Par '08), Aug. 26-29, 2008, pp. 141-150.

Lenoski et al., "The Stanford DASH Multiprocessor", Computer. vol. 25, Issue 3, Mar. 1992. pp. 63-79.

International Search Report and Written Opinion for PCT Application No. PCT/US2010/038956, mailed on Feb. 8, 2011, 8 pages.

International Preliminary Report on Patentability for PCT Application No. PCT/US2010/038956, mailed on Jan. 12, 2012, 5 pages.

Office Action for Chinese Patent Application No. 201010227058.1, mailed on Feb. 13, 2012, 4 pages of Office Action and 6 pages of English Translation.

Office Action for U.S. Appl. No. 12/495,722, mailed Nov. 9, 2011, 25 pages.

Office Action Received for U.S Appl. No. 12/495,722, mailed Mar. 28, 2012, 23 pages.

\* cited by examiner

ALLOCATION AND WRITE POLICY FOR A GLUELESS AREA-EFFICIENT DIRECTORY CACHE FOR HOTLY CONTESTED CACHE LINES

FIELD

The present disclosure generally relates to the field of electronics. More particularly, an embodiment of the invention relates to allocation and/or write policy for a glueless area-efficient directory cache for hotly contested cache lines.

BACKGROUND

Cache memory in computer systems may be kept coherent using a snoopy bus or a directory based protocol. In either case, a memory address is associated with a particular location in the system. This location is generally referred to as the "home node" of a memory address.

In a directory based protocol, processing/caching agents may send requests to a home node for access to a memory address with which a corresponding "home agent" (HA) is associated. Accordingly, performance of such computer systems may be directly dependent on how efficiently home agent data and/or memory is managed.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

Some embodiments discussed herein are generally related to allocation and/or write policy for a glueless area-efficient directory cache for hotly contested cache lines. An embodiment pertains to the allocation and write policy for an on-die directory cache which is used to speed up the lookup of information from an off-die directory, e.g., residing in main memory (such as those discussed with reference to FIGS. 1-2 and 5-6). In one embodiment, the directory contains information about the caching status of a coherence unit (e.g., a cache line) in the system's caching agents for the purpose of reducing the snoop traffic by avoiding or reducing snoop broadcasting.

The on-die directory cache is referred to herein as the "HitME" cache because one of its primary roles is to reduce the access latency of hotly contested cache lines that are transferred from one caching agent to another agent. The hotly contested cache lines may reside in caching agents as M (Modified) copies or E (Exclusive) copies, and thus the name HitME cache. Caching agents requesting a line that is in an Invalid (I) state or in Shared (S) state will be forwarded a copy from the home agent; thus, the HitME cache does not need to store information for such lines as there will be no latency reduction for them if the caching status was retrieved earlier by way of the HitME cache.

Generally, cache memory in computing systems (such as in a Quick Path Interface (QPI) system) may be kept coherent using a snoopy bus or a directory based protocol. In either case, a system memory address may be associated with a particular location in the system. This location is generally referred to as the "home node" of the memory address. In a directory based protocol, processing/caching agents may send requests to the home node for access to a memory address with which a "home agent" is associated.

Moreover, in a distributed cache coherence protocol, caching agents make requests to home agents which control coherent access to, for example, a subset of the memory space served by the collocated memory controller. Home agents are responsible for ensuring that the most recent copy of the data is returned to the requestor either from main memory or the caching agent which owns the data. The home agent is also responsible for invalidating other caching agents if the request was for an exclusive copy. For these purposes, the home agent can either snoop every caching agent or it can rely on a directory to track a reduced set of caching agents where data may reside.

Figure 1:
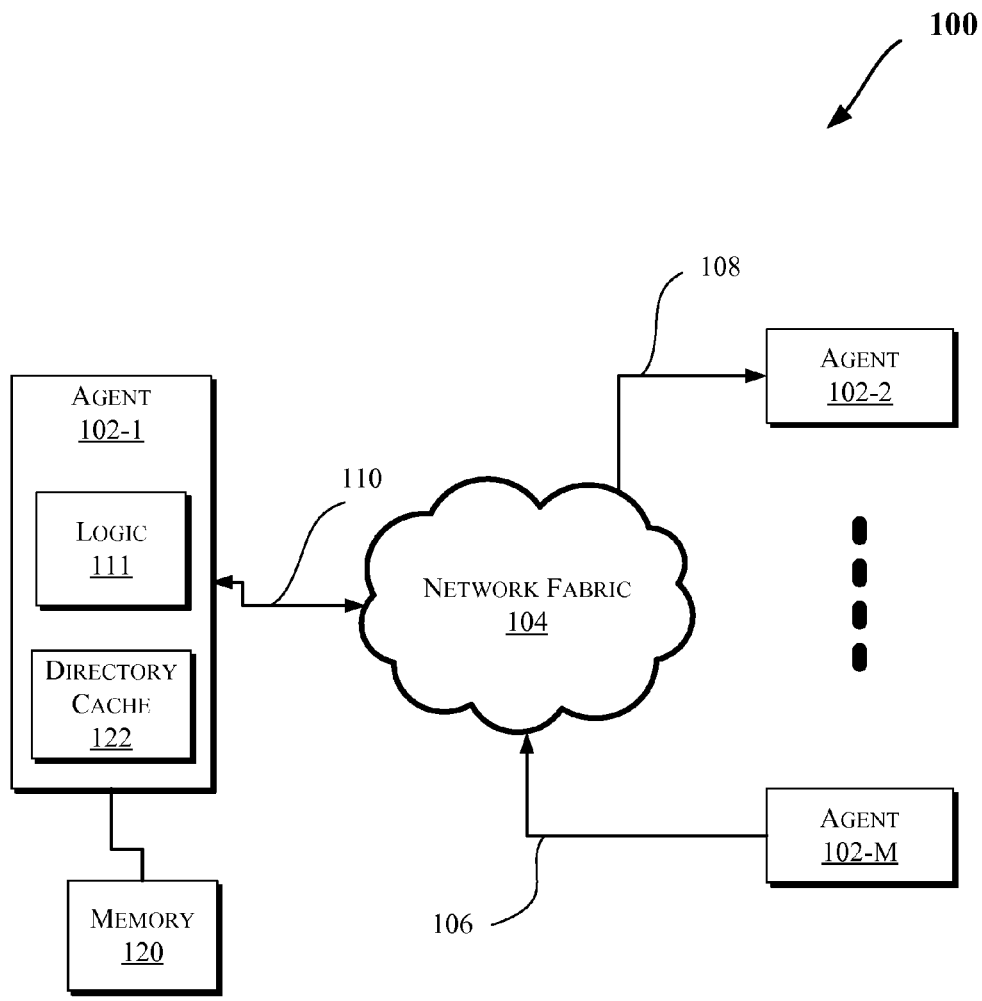
FIGS. 1-2 and 5-6 illustrate block diagrams of embodiments of computing systems, which may be utilized to implement various embodiments discussed herein.

Various computing systems may be used to implement embodiments, discussed herein, such as the systems discussed with reference to FIGS. 1-2 and 5-6. More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, one or more of the agents 102 may be any of components of a computing system, such as the computing systems discussed with reference to FIGS. 5-6.

As illustrated in FIG. 1, the agents 102 may communicate via a network fabric 104. In one embodiment, the network fabric 104 may include a computer network that allows various agents (such as computing devices) to communicate data. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with Fully Buffered Dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point or shared network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Additionally, at least one of the agents 102 may be a home agent and one or more of the agents 102 may be requesting or caching agents as will be further discussed herein. As shown, at least one agent (only one shown for agent 102-1) may include or have access to one or more logics (or engines) 111 to manage write/allocate operations directed at an on-die directory cache (e.g., the "HitME" cache discussed herein). Further, in an embodiment, one or more of the agents 102 (only one shown for agent 102-1) may have access to a memory (which may be dedicated to the agent or shared with other agents) such as memory 120. Also, one or more of the agents 102 (only one shown for agent 102-1) may maintain entries in one or more storage devices (only one shown for agent 102-1, such as directory cache(s) 122, e.g., implemented as a table, queue, buffer, linked list, etc.) to track information about items stored/maintained by the agent 102-1 (as a home agent) and/or other agents (including Caching Agents (CAs) for example) in the system. In some embodiments, each or at least one of the agents 102 may be coupled to the memory 120 and/or a corresponding directory cache 122 that are either on the same die as the agent or otherwise accessible by the agent.

Figure 2:
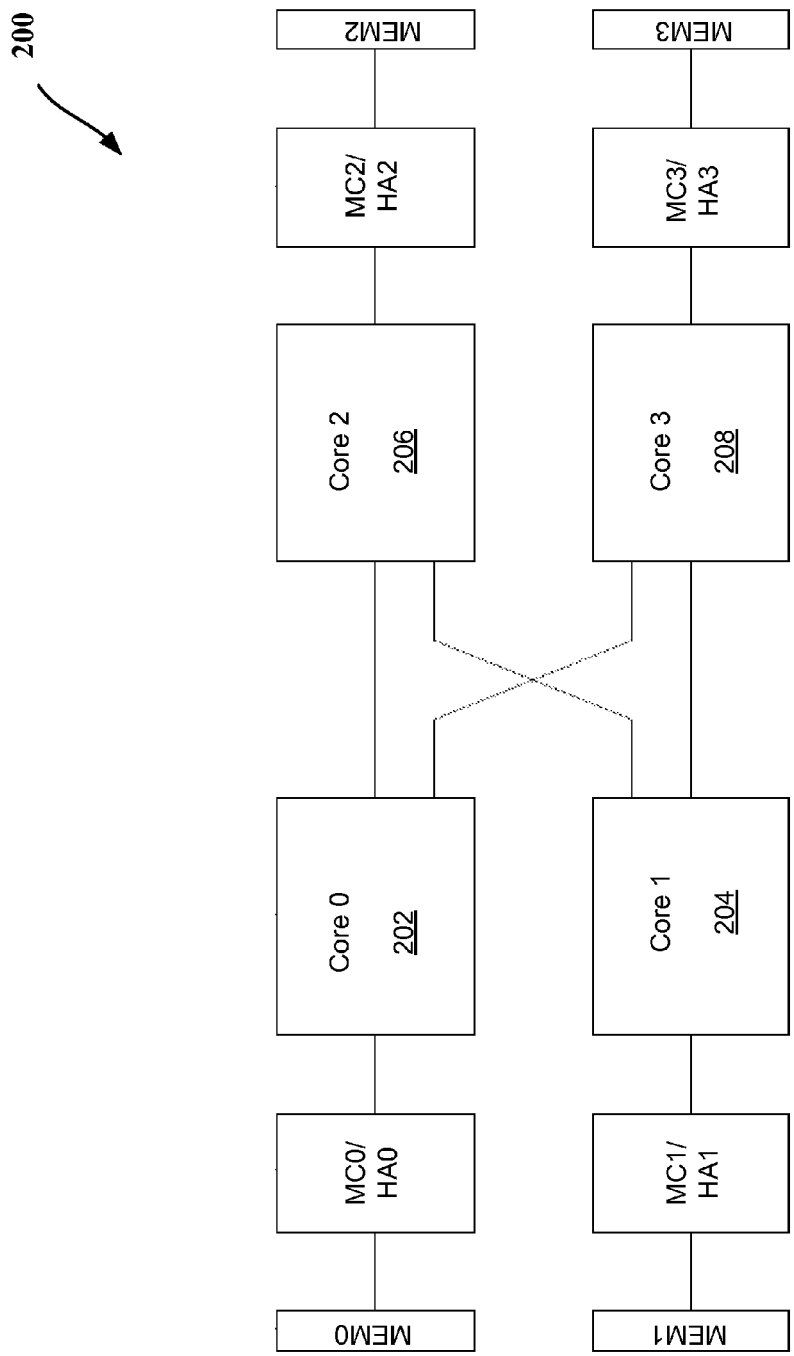

FIG. 2 is a block diagram of a computing system in accordance with an embodiment. System 200 may include a plurality of sockets 202-208 (four shown but some embodiments may have more or less socket). Each socket may include a processor in an embodiment. Also, each socket may be coupled to the other sockets via point-to-point (PtP) link such as discussed with reference FIG. 6. As discussed with respect to FIG. 1 with reference to the network fabric 104, each socket may be coupled to a local portion of system memory, e.g., formed of a plurality of Dual Inline Memory Modules (DIMMs) that may include dynamic random access memory (DRAM).

As shown in FIG. 2, each socket may be coupled to a memory controller (MC)/Home Agent (HA) (such as MC0/HA0 through MC3/HA3). The memory controllers may be coupled to a corresponding local memory (labeled as MEM0 through MEM3), which may be a portion of system memory (such as memory 512 of FIG. 5). In some embodiments, the memory controller (MC)/Home Agent (HA) (such as MC0/HA0 through MC3/HA3) may be the same or similar to agent 102-1 of FIG. 1 (e.g., including logic 111, etc.) and the memory, labeled as MEM0 through MEM3, may be the same or similar to memory 120 of FIG. 1. Also, in one embodiment, MEM0 through MEM3 may be configured to mirror data, e.g., as master and slave. Also, one or more components of system 200 may be included on the same integrated circuit die in some embodiments.

An implementation such as shown in FIG. 2 thus may be for a socket glueless configuration for allocation and/or write policy of a directory cache (such as HitME cache discussed herein). For example, data assigned to a memory controller (such as MC0/HA0) may be written or allocated to another memory controller (such as MC3/HA3) over the PtP links.

In some embodiments, the directory information (e.g., stored in directory cache 122 or HitME cache) may contain one bit per Caching Agent (CA), indicating the presence (1) or absence (0) of the data at the corresponding caching agent as recorded during prior requests or snoop responses coming from the specific caching agent. Of course, depending on the implementation, the use of 0's and 1's may be reversed.

Furthermore, the directory information could be alternatively based on a compressed format, where the bits may encode the presence/absence in a cluster (e.g., two or more) of caching agents (or all caching agents) and/or other state information. The HitME cache may work with either the full representation or compressed version of the directory. Regardless of the implementation of the directory information, it is referred to herein as the Presence Vector (PV) associated with the cache line. Further, in some embodiments, the PV bits have a permanent back-up in memory (e.g., in the ECC (Error Correction Code) bits) alongside a copy of the coherence unit (cache line) to which they pertain, for example.

At times, the PV bits for certain lines may be stored in an on-die directory cache (e.g., directory cache 122 of FIG. 1). Caching the PV bits on-die can speedup the process of sending out snoop requests by the home agent. In the absence of a directory cache, the PV bits may be available only after a lengthier access (e.g., 50 ns) to a main memory (such as memory 512 of FIG. 5). In instances where snoop requests are on the latency-critical path, speeding up this process is beneficial for system performance. For example, many requests received by a home agent may result in a cache-to-cache transfer where the most recent copy of the data is found in a third-party caching agent. By contrast, there are instances where the memory copy is clean and no other caching agents need to be snooped. In the latter instances, obtaining the PV bits from memory presents almost no additional overhead, as this may be done in parallel with the data access itself.

Moreover, in at least some embodiments, all directory caches (e.g., directory cache(s) 122) have an allocation and write policy; whereas, traditionally, all read or lookup requests result in an allocation, and either all update (write-through) or all deallocate (write-back) result in a write to the memory directory PV.

Figure 3:
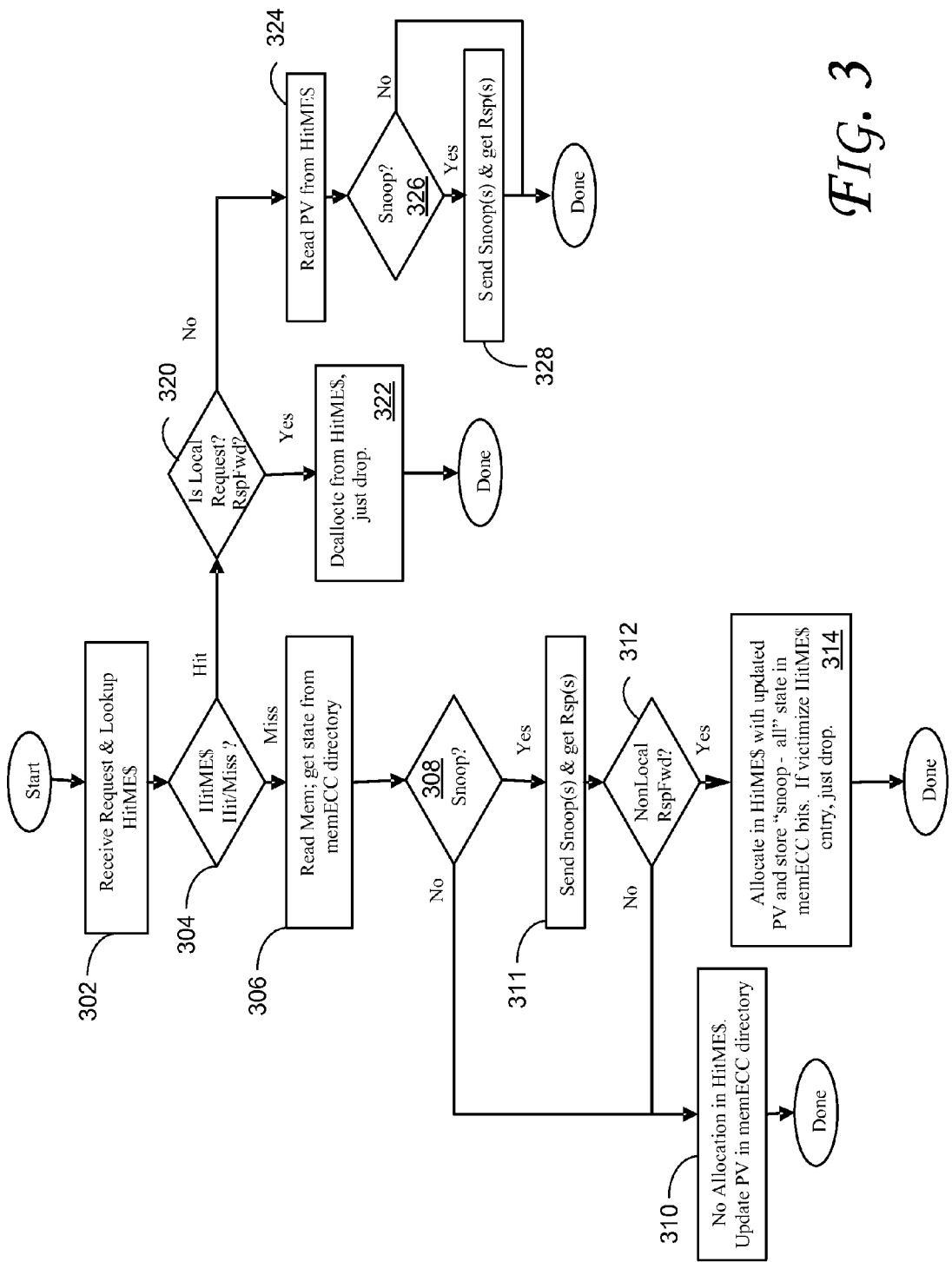
FIGS. 3-4 illustrate flow diagrams according to some embodiments.

Operations discussed with reference to FIGS. 3-4 may be performed by components discussed with reference to FIG. 1, 2, 5, or 6, where FIG. 3 illustrates a flow diagram of a write-on-allocate policy, according to an embodiment.

Referring to FIGS. 1-3, at an operation 302, a request for data (e.g., for an address associated with a home agent) is received and the request is serviced (e.g., by the logic 111) by looking up for a corresponding entry in the directory cache (e.g., HitME 122). At an operation 304, it is determined whether a hit or miss has occurred with respect to the request. If a miss occurs, an operation 306, the data for the request is read from a main memory (e.g., memory 120) and the state of the corresponding cache line is obtained from a directory (e.g., memECC (memory portion with Error Correction Code). In some embodiments, the PV bits have a permanent back-up in memory (e.g., in the ECC bits, also referred to herein as "memECC") alongside the coherence unit (cache line) to which they pertain, for example.

At an operation 308, it is determined whether a snoop is required (e.g., if the cache line has a shared (S) status). If no snoop is needed, at an operation 310, no allocation in the directory cache (e.g., directory cache 122 or HitME cache) and the PV bits in memECC directory are updated. If snoop(s) are needed, an operation 311 sends one or more snoops and receives the responses from other agents in the system. At an operation 312 if no nonlocal response is to be forwarded, the flow continues with operation 310. Otherwise, at an operation 314, an allocation in the directory cache (e.g., directory cache 122 or HitME cache) is made with updated PV bits and a "snoop-all" state is stored in the memECC bits. However, if the change victimizes a HitME cache entry, the victimized HitME cache entry is simply dropped.

If a hit occurs at operation 304, at an operation 320, it is determined whether the request is a local request and the response is to be forwarded. If so, an operation 322 deallocates a corresponding entry in the directory cache (e.g., directory cache 122 or HitME cache) and the request is dropped. Otherwise, an operation 324 reads the PV bits from the directory cache (e.g., directory cache 122 or HitME cache). At an operation 326, it is determined whether a snoop is needed. If a snoop is needed, an operation 328 sends one or more snoops and receives the responses.

Accordingly, one embodiment relates to a novel directory cache called the HitME cache. The write policy of the HitME cache is called "write-on-allocate" which writes the memory directory PV bits to a "snoop-all" state upon allocation (e.g., at operation 314). The HitME cache may also implement the AllocateShared policy which allocates entries for cache lines having a high probability of encountering a future snoop-critical access. By setting the memory directory PV bits to snoop-all on allocation, any changes to the cached PV bits in the HitME cache need not be reflected in the memory directory PV bits. Even when the line is deallocated from the HitME cache, it does not have to update the memory directory PV bits since the memory directory PV bits were set to the most conservative state at allocation.

Figure 4:
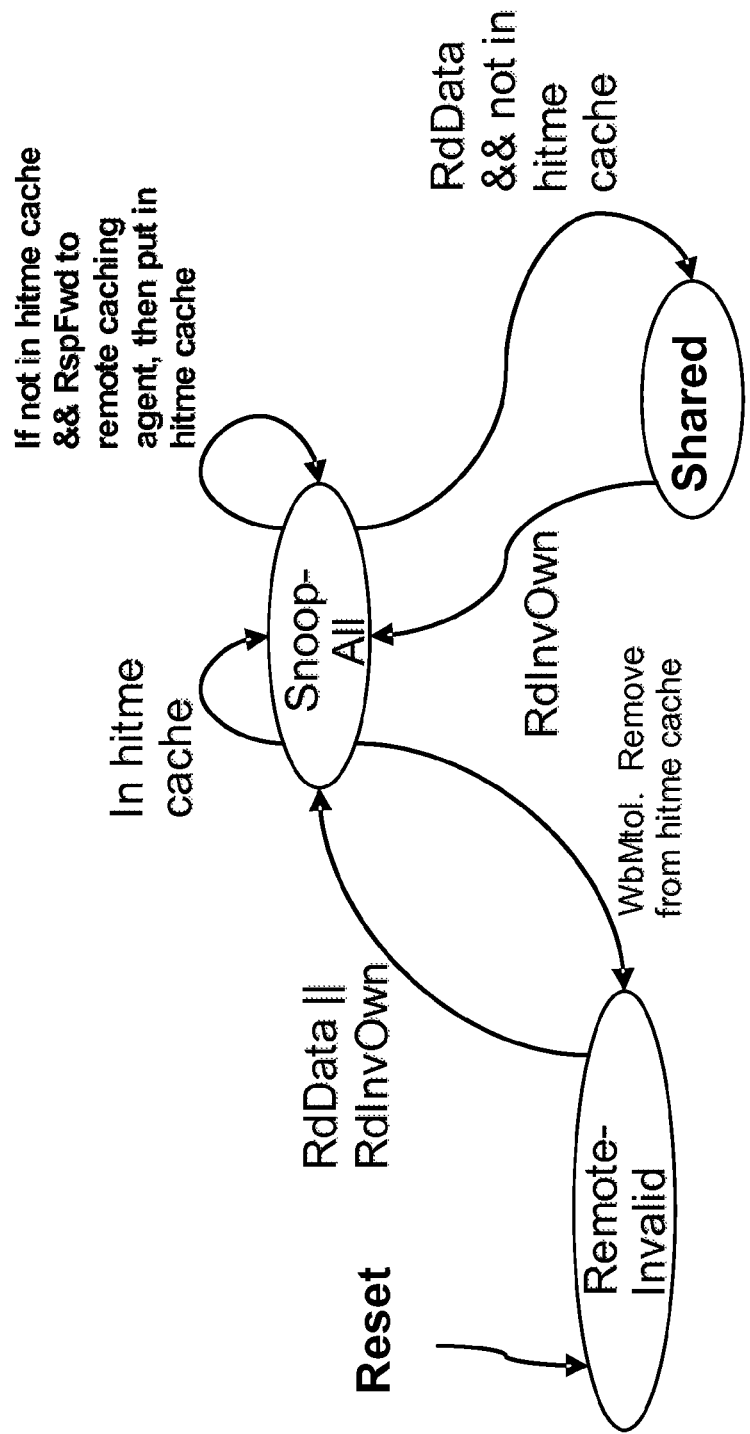

FIG. 4 illustrates a flow diagram of a memECC directory states, according to an embodiment. In some embodiments, the memory directory PV bits may be implemented in such a way that there is always an encoding for a snoop-all state which implies that snoops have to be broadcasted to all caching agents when this state is detected. For example, with two PV bits available for encoding memory directory state, the state encoded may be Remote-Invalid, Shared, and Snoop-All which only makes use of three of the available four states that can be encoded. While it might be beneficial to encode two caching agent sub regions instead of a single snoop-all state to reduce the number of snoops that have to be issued, it is more beneficial to have the snoop-all state in the presence of the HitME cache to reduce the number of memory directory updates in some embodiments. As a result, any cache line allocated in the HitME cache will always have its memory directory PV bits in the snoop-all state to eliminate any updates to the memory directory from changing HitME cache PV bits.

Further, since the AllocateShared policy gives more room in the HitME cache for entries which are shared or contended by multiple caching agents, the lines accessed actively tend to stay in the HitME cache and will be able to make use of the precise PV bits in the HitME cache. To further increase the HitME cache capacity for larger systems, the HitME cache may also employ a policy of deallocating lines from the HitME cache if the line will be exclusively owned by the local caching agent in some embodiments. For example, the remote-Invalid state may be used to indicate that all remote caching agents do not have a copy of the cache line; however, the local caching agent may or may not have a copy of the cache line and the local caching agent needs to be snooped to determine its actual state. In most scalable systems built, the local snoop is always issued before the cache line is looked up in memory to look at the PV bits from the memory directory in an embodiment. As a result, the local snoops do not consume the expensive links bandwidth and generally return snoop responses before the memory lookup completes. Hence, there is no loss in information or latency from this cache line not being available in the HitME cache, and its place may be taken by a more critical cache line which will benefit from being in the HitME cache; thus, effectively increasing the HitME cache size.

The HitME cache's "write-on-allocate" policy in combination with the "snoop-all" state in memory directory has the unique result of not needing any new read or write flows to the memory to enable the HitME cache; hence, providing a glueless directory cache addition to an existing memory directory based home snoopy Home Agent. This in turn reduces the number of memory directory updates for hotly contested cache lines thus increasing the effective memory bandwidth available to the application. It also may avoid the need for any complicated error correction policies in the HitME cache since the PV bits in the memory directory may be used as backup if an error is detected in the HitME cache information read out.

The snoop-all encoding in the memory directory PV bits has other uses beyond being advantageous for the HitME cache in that server configuration needing advanced RAS (Reliability, Availability, and Serviceability) features such as memory mirroring having a need for the snoop-all state. Some embodiments also increase the effective hit ratio of the HitME cache by deallocating local exclusively owned lines from the HitME cache. The memECC directory state diagram of FIG. 4 shows the transition of the directory state in main memory. For simplicity, only RdData (e.g., request to read data), RdInvOwn (e.g., a read operation which acquires Exclusive ownership), and WbMtoI (e.g., indicating that a store is done to a full cache line without first reading it) commands are shown in FIG. 4 and the RspFwd snoop response (e.g., indicating forwarding of data from a third party caching agent) is shown. Other QPI commands may be straightforwardly added to the state diagram of FIG. 4.

In some embodiments, the use of directories may avoid or reduce link bottlenecks. The use of the write-on-allocate policy and snoop-all state in the memory PV bits will decrease memory directory update traffic in the presence of a directory cache. The deallocation of cache line becoming locally exclusive may also increase the effective size of a directory cache. This will either increase performance or save design budget by reducing the size of the directory cache.

Figure 5:
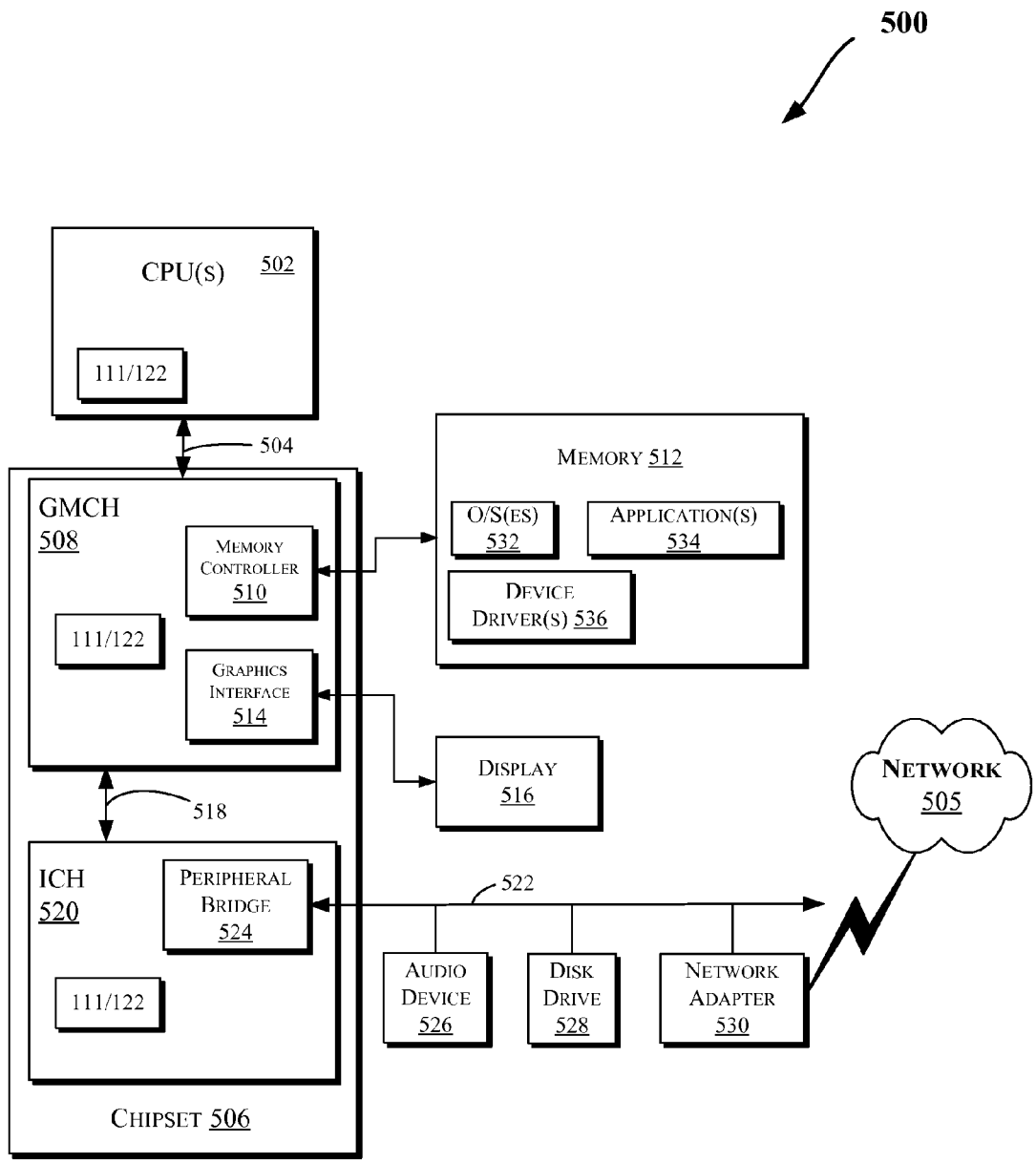

FIG. 5 illustrates a block diagram of an embodiment of a computing system 500. One or more of the agents 102 of FIG. 1 may comprise one or more components of the computing system 500. Also, various components of the system 500 may include a directory cache (e.g., such as directory cache 122 of FIG. 1) and/or a logic (such as logic 111 of FIG. 1) as illustrated in FIG. 5. However, the directory cache and/or logic may be provided in locations throughout the system 500, including or excluding those illustrated. The computing system 500 may include one or more central processing unit(s) (CPUs) 502 (which may be collectively referred to herein as "processors 502" or more generically "processor 502") coupled to an interconnection network (or bus) 504. The processors 502 may be any type of processor such as a general purpose processor, a network processor (which may process data communicated over a computer network 505), etc. (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors.

The processor 502 may include one or more caches (e.g., other than the illustrated directory cache 122), which may be private and/or shared in various embodiments. Generally, a cache stores data corresponding to original data stored elsewhere or computed earlier. To reduce memory access latency, once data is stored in a cache, future use may be made by accessing a cached copy rather than refetching or recomputing the original data. The cache(s) may be any type of cache, such a level 1 (L1) cache, a level 2 (L2) cache, a level 3 (L3), a mid-level cache, a last level cache (LLC), etc. to store electronic data (e.g., including instructions) that is utilized by one or more components of the system 500. Additionally, such cache(s) may be located in various locations (e.g., inside other components to the computing systems discussed herein, including systems of FIG. 1, 2, 5, or 6).

A chipset 506 may additionally be coupled to the interconnection network 504. Further, the chipset 506 may include a graphics memory control hub (GMCH) 508. The GMCH 508 may include a memory controller 510 that is coupled to a memory 512. The memory 512 may store data, e.g., including sequences of instructions that are executed by the processor 502, or any other device in communication with components of the computing system 500. Also, in one embodiment of the invention, the memory 512 may include one or more volatile storage (or memory) devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 504, such as multiple processors and/or multiple system memories.

The GMCH 508 may further include a graphics interface 514 coupled to a display device 516 (e.g., via a graphics accelerator in an embodiment). In one embodiment, the graphics interface 514 may be coupled to the display device 516 via an accelerated graphics port (AGP). In an embodiment of the invention, the display device 516 (such as a flat panel display) may be coupled to the graphics interface 514 through, for example, a signal converter that translates a digital representation of an image stored in a storage device such as video memory or system memory (e.g., memory 512) into display signals that are interpreted and displayed by the display 516.

As shown in FIG. 5, a hub interface 518 may couple the GMCH 508 to an input/output control hub (ICH) 520. The ICH 520 may provide an interface to input/output (I/O) devices coupled to the computing system 500. The ICH 520 may be coupled to a bus 522 through a peripheral bridge (or controller) 524, such as a peripheral component interconnect (PCI) bridge that may be compliant with the PCIe specification, a universal serial bus (USB) controller, etc. The bridge 524 may provide a data path between the processor 502 and peripheral devices. Other types of topologies may be utilized. Also, multiple buses may be coupled to the ICH 520, e.g., through multiple bridges or controllers. Further, the bus 522 may comprise other types and configurations of bus systems. Moreover, other peripherals coupled to the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 522 may be coupled to an audio device 526, one or more disk drive(s) 528, and a network adapter 530 (which may be a NIC in an embodiment). In one embodiment, the network adapter 530 or other devices coupled to the bus 522 may communicate with the chipset 506. Also, various components (such as the network adapter 530) may be coupled to the GMCH 508 in some embodiments of the invention. In addition, the processor 502 and the GMCH 508 may be combined to form a single chip. In an embodiment, the memory controller 510 may be provided in one or more of the CPUs 502. Further, in an embodiment, GMCH 508 and ICH 520 may be combined into a Peripheral Control Hub (PCH).

Additionally, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 512 may include one or more of the following in an embodiment: an operating system (O/S) 532, application 534, directory 501, and/or device driver 536. The memory 512 may also include regions dedicated to Memory Mapped I/O (MMIO) operations. Programs and/or data stored in the memory 512 may be swapped into the disk drive 528 as part of memory management operations. The application(s) 534 may execute (e.g., on the processor(s) 502) to communicate one or more packets with one or more computing devices coupled to the network 505. In an embodiment, a packet may be a sequence of one or more symbols and/or values that may be encoded by one or more electrical signals transmitted from at least one sender to at least on receiver (e.g., over a network such as the network 505). For example, each packet may have a header that includes various information which may be utilized in routing and/or processing the packet, such as a source address, a destination address, packet type, etc. Each packet may also have a payload that includes the raw data (or content) the packet is transferring between various computing devices over a computer network (such as the network 505).

In an embodiment, the application 534 may utilize the O/S 532 to communicate with various components of the system 500, e.g., through the device driver 536. Hence, the device driver 536 may include network adapter 530 specific commands to provide a communication interface between the O/S 532 and the network adapter 530, or other I/O devices coupled to the system 500, e.g., via the chipset 506.

In an embodiment, the O/S 532 may include a network protocol stack. A protocol stack generally refers to a set of procedures or programs that may be executed to process packets sent over a network 505, where the packets may conform to a specified protocol. For example, TCP/IP (Transport Control Protocol/Internet Protocol) packets may be processed using a TCP/IP stack. The device driver 536 may indicate the buffers in the memory 512 that are to be processed, e.g., via the protocol stack.

The network 505 may include any type of computer network. The network adapter 530 may further include a direct memory access (DMA) engine, which writes packets to buffers (e.g., stored in the memory 512) assigned to available descriptors (e.g., stored in the memory 512) to transmit and/or receive data over the network 505. Additionally, the network adapter 530 may include a network adapter controller, which may include logic (such as one or more programmable processors) to perform adapter related operations. In an embodiment, the adapter controller may be a MAC (media access control) component. The network adapter 530 may further include a memory, such as any type of volatile/nonvolatile memory (e.g., including one or more cache(s) and/or other memory types discussed with reference to memory 512).

Figure 6:
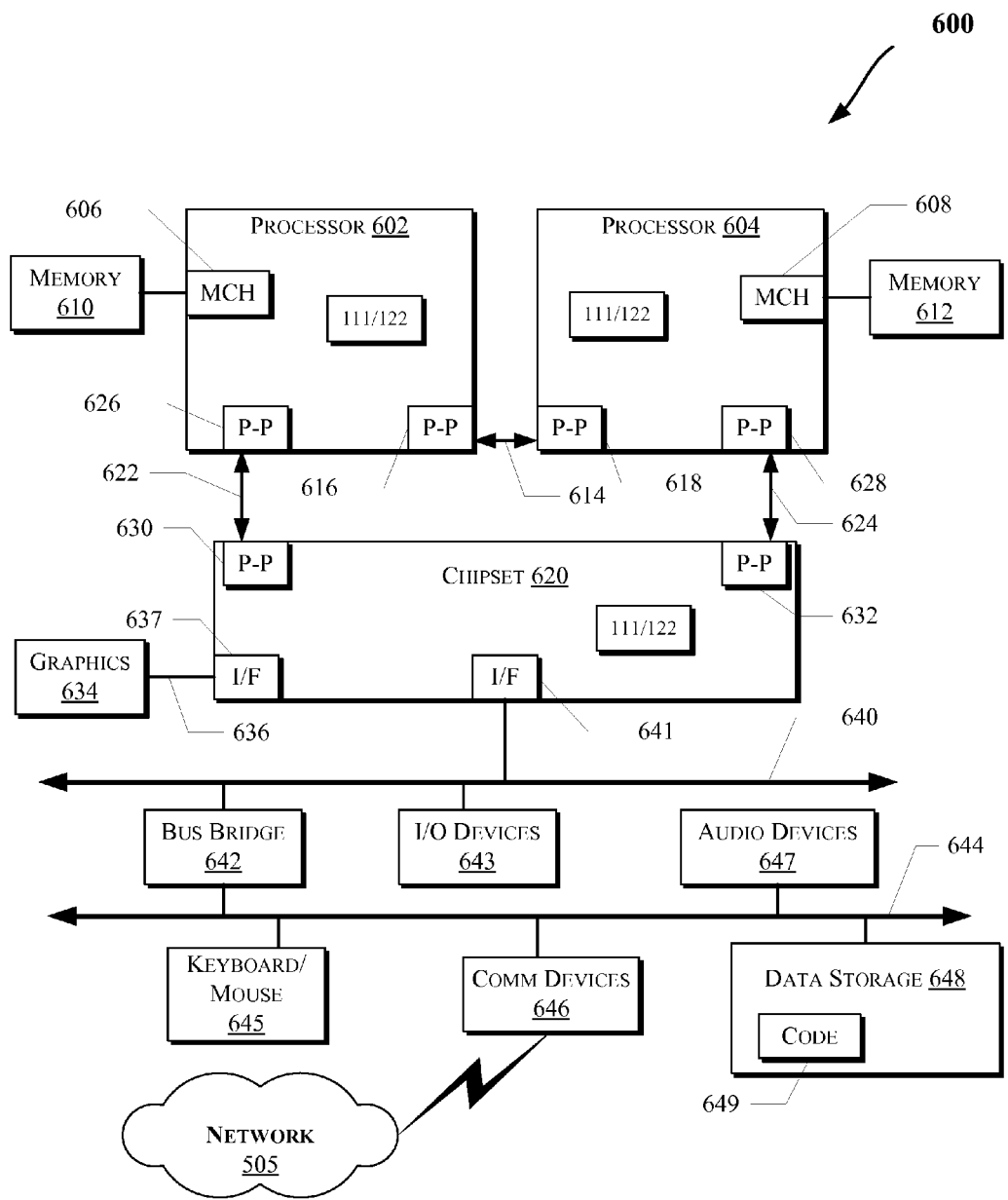

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (GMCH) 606 and 608 to enable communication with memories 610 and 612. The memories 610 and/or 612 may store various data such as those discussed with reference to the memory 612 of FIG. 6. As shown in FIG. 6, the processors 602 and 604 (or other components of system 600 such as chipset 620, I/O devices 643, etc.) may also include one or more cache(s) such as those discussed with reference to FIGS. 1-5.

In an embodiment, the processors 602 and 604 may be one of the processors 602 discussed with reference to FIG. 6. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a high-performance graphics circuit 634 via a high-performance graphics interface 636, e.g., using a PtP interface circuit 637.

In at least one embodiment, a directory cache and/or logic may be provided in one or more of the processors 602, 604 and/or chipset 620. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6. For example, various components of the system 600 may include a directory cache (e.g., such as directory cache 122 of FIG. 1) and/or a logic (such as logic 111 of FIG. 1). However, the directory cache and/or logic may be provided in locations throughout the system 600, including or excluding those illustrated.

The chipset 620 may communicate with the bus 640 using a PtP interface circuit 641. The bus 640 may have one or more devices that communicate with it, such as a bus bridge 642 and I/O devices 643. Via a bus 644, the bus bridge 642 may communicate with other devices such as a keyboard/mouse 645, communication devices 646 (such as modems, network interface devices, or other communication devices that may communicate with the computer network 605), audio I/O device, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-6. Additionally, such computer-readable media may be downloaded as a computer program product, wherein the program may be transferred from a remote computer (e.g., a server) to a requesting computer (e.g., a client) through data signals provided in a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a first agent to receive a request corresponding to a cache line associated with the first agent, from a second agent; and
a directory cache, coupled to the first agent, to store data corresponding to a caching status of the cache line in each of a plurality of caching agents coupled to the first agent,
wherein an entry in the directory cache is to be allocated in response to a miss, corresponding to the request, in the directory cache and a determination that the cache status of the cache line is to be updated to a snoop-all state, based on a snoop response from a different agent than the first agent, and wherein the snoop-all state is to indicate that one or more snoops are to be broadcasted to all of the plurality of caching agents in response to detection of the snoop-all state.

2. The apparatus of claim 1, wherein the caching status is to be determined based on a presence vector corresponding to a plurality of prior requests or snoop responses from two or more corresponding caching agents of the plurality of caching agents.

3. The apparatus of claim 2, further comprising a memory to store a copy of the presence vector with a copy of the cache line.

4. The apparatus of claim 1, wherein the caching status is to be determined based on a presence vector corresponding to a plurality of prior requests or snoop responses from all of the plurality of caching agents.

5. The apparatus of claim 4, further comprising a memory to store a copy of the presence vector with a copy of the cache line.

6. The apparatus of claim 1, wherein entries are to be allocated in the directory cache for cache lines having a high probability of encountering a future snoop critical access.

7. The apparatus of claim 1, wherein the cache line has a state selected from a group consisting of: a modified state and exclusive state.

8. The apparatus of claim 1, wherein the cache line has a state other than invalid or shared.

9. The apparatus of claim 1, wherein the caching status is to be determined based on a prior request or snoop response from a corresponding caching agent of the plurality of caching agents.

10. The apparatus of claim 1, wherein in response to a hit, corresponding to the request, in the directory cache and a determination that the request is a local request, a corresponding entry in the directory cache is to be deallocated.

11. The apparatus of claim 1, wherein the first agent is to send one or more snoops to one or more of the plurality of caching agents identified by the directory cache to have a copy of the data corresponding to the request.

12. The apparatus of claim 1, wherein the entry in the directory cache is to be allocated in response to response forwarded from a non-local caching agent.

13. The apparatus of claim 1, wherein two or more of the first agent, the second agent, and the directory cache are on a same integrated circuit die.

14. A method comprising:
    receiving a request corresponding to a cache line associated with a first agent, from a second agent;
    storing data corresponding to a caching status of the cache line in each of a plurality of caching agents coupled to the first agent; and
    allocating an entry in the directory cache in response to a miss, corresponding to the request, in the directory cache and a determination that the cache status of the cache line is to be updated to a snoop-all state, based on a snoop response from a different agent than the first agent, and wherein the snoop-all state is to indicate that one or more snoops are to be broadcasted to all of the plurality of caching agents in response to detection of the snoop-all state.

15. The method of claim 14, further comprising determining the caching status based on a presence vector corresponding to a plurality of prior requests or snoop responses from two or more corresponding caching agents of the plurality of caching agents.

16. The method of claim 14, further comprising determining the caching status based on a presence vector corresponding to a plurality of prior requests or snoop responses from all of the plurality of caching agents.

17. The method of claim 14, further comprising allocating entries in the directory cache for cache lines having a high probability of encountering a future snoop critical access.

18. The method of claim 14, further comprising determining the caching status based on a prior request or snoop response from a corresponding caching agent of the plurality of caching agents.

19. The method of claim 14, further comprising deallocating an entry in the directory cache in response to a hit, corresponding to the request, in the directory cache and a determination that the request is a local request.

20. The method of claim 14, further comprising the first agent sending one or more snoops to one or more of the plurality of caching agents identified by the directory cache to have a copy of the data corresponding to the request.

21. A computing system comprising:
    a memory to store a copy of data stored in a directory cache;
    a first processor to receive a request corresponding to a cache line associated with the first processor, from a second processor; and
    a directory cache, coupled to the first processor, to store data corresponding to a caching status of the cache line in each of a plurality of caching agents coupled to the first processor,
    wherein an entry in the directory cache is to be allocated in response to a miss, corresponding to the request, in the directory cache and a determination that the cache status of the cache line is to be updated to a snoop-all state, based on a snoop response from a different agent than the first processor, and wherein the snoop-all state is to indicate that one or more snoops are to be broadcasted to all of the plurality of caching agents in response to detection of the snoop-all state.

22. The system of claim 21, wherein the caching status is to be determined based on a presence vector corresponding to a plurality of prior requests or snoop responses from two or more corresponding caching agents of the plurality of caching agents.

23. The system of claim 22, wherein the memory is to store a copy of the presence vector with a copy of the cache line.

24. The system of claim 21, wherein the caching status is to be determined based on a presence vector corresponding to a plurality of prior requests or snoop responses from all of the plurality of caching agents.

25. The system of claim 24, wherein the memory is to store a copy of the presence vector with a copy of the cache line.

26. The system of claim 21, wherein entries are to be allocated in the directory cache for cache lines having a high probability of encountering a future snoop critical access.

27. The system of claim 21, wherein the cache line has a state selected from a group consisting of: a modified state and exclusive state.

28. The system of claim 21, wherein the cache line has a state other than invalid or shared.

29. The system of claim 21, wherein the caching status is to be determined based on a prior request or snoop response from a corresponding caching agent of the plurality of caching agents.

30. The system of claim 21, wherein in response to a hit, corresponding to the request, in the directory cache and a determination that the request is a local request, a corresponding entry in the directory cache is to be deallocated.

* * * * *